(12) United States Patent
Lee et al.

(10) Patent No.: US 11,092,219 B2
(45) Date of Patent: Aug. 17, 2021

(54) LINEAR MOTION SYSTEM

(71) Applicant: TBI MOTION TECHNOLOGY CO., LTD., New Taipei (TW)

(72) Inventors: Ching-Sheng Lee, New Taipei (TW); Tien-Chang Wu, New Taipei (TW)

(73) Assignee: TBI Motion Technology Co., Ltd., New Taipei (TW)

(*) Notice: Subject to any disclaimer, the term of this patent is extended or adjusted under 35 U.S.C. 154(b) by 0 days.

(21) Appl. No.: 17/089,478

(22) Filed: Nov. 4, 2020

(65) Prior Publication Data
US 2021/0140522 A1  May 13, 2021

(30) Foreign Application Priority Data
Nov. 8, 2019  (CN) .......................... 201921918529.6

(51) Int. Cl.
| | |
|---|---|
| *F16H 25/22* | (2006.01) |
| *F16H 19/06* | (2006.01) |
| *G07C 3/02* | (2006.01) |
| *H02K 7/06* | (2006.01) |

(Continued)

(52) U.S. Cl.
CPC ......... *F16H 25/2214* (2013.01); *F16H 19/06* (2013.01); *G07C 3/02* (2013.01); *H02K 7/06* (2013.01); *F16H 2019/0686* (2013.01); *F16H 2025/204* (2013.01); *F16H 2025/2075* (2013.01); *G06F 3/14* (2013.01)

(58) Field of Classification Search
CPC ................. F16H 25/2214; F16H 19/06; F16H 2019/0686; F16H 2025/204; F16H 2025/2075; G07C 3/02; H02K 7/06; G06F 3/14
See application file for complete search history.

(56) References Cited

U.S. PATENT DOCUMENTS

| | | | |
|---|---|---|---|
| 5,644,951 A | 7/1997 | Hatamura | |
| 6,259,177 B1* | 7/2001 | Deschamplain | F03G 3/00 310/20 |
| 9,637,164 B2* | 5/2017 | Shavrnoch | F16H 25/2204 |

(Continued)

FOREIGN PATENT DOCUMENTS

| | | |
|---|---|---|
| CN | 211343906 U | 8/2020 |
| DE | 102007007885 A1 | 9/2008 |
| TW | M591576 U | 3/2020 |

*Primary Examiner* — David M Fenstermacher
(74) *Attorney, Agent, or Firm* — Muncy, Geissler, Olds & Lowe, P.C.

(57) ABSTRACT

A linear motion system includes a guiding member, a moving member, a plurality of rolling members, a controller, a preload sensing member and a preload adjusting module. The moving member is slidably disposed on the guiding member, and the moving member and the guiding member together form a circulation path. The rolling members are accommodated in the circulation path. The preload sensing member is disposed on the moving member. The preload sensing member detects a preload value generated by the rolling members and applied to the moving member, and outputs a detecting signal to the controller. The preload driver and adjusting assembly of the preload adjusting module are disposed on the moving member. The controller controls the preload driver to adjust the adjusting assembly according to the detecting signal to adjust the preload value to a preset value.

17 Claims, 9 Drawing Sheets

(51) Int. Cl.
    *F16H 25/20*     (2006.01)
    *G06F 3/14*     (2006.01)

(56) References Cited

U.S. PATENT DOCUMENTS

| | | | |
|---|---|---|---|
| 9,638,054 B2 * | 5/2017 | Katagake | H02K 7/106 |
| 9,869,348 B2 * | 1/2018 | Baric | F16C 29/045 |
| 9,912,271 B2 * | 3/2018 | Lee | H02P 8/36 |
| 9,964,198 B2 * | 5/2018 | Brage | F16H 57/0497 |
| 10,122,311 B2 * | 11/2018 | Andrieux | H02P 25/064 |
| 10,215,264 B2 * | 2/2019 | Ungar | F16D 1/0864 |
| 10,248,093 B2 * | 4/2019 | Pietrusinski | G05B 19/042 |
| 10,413,958 B2 * | 9/2019 | Horii | B21D 28/145 |
| 10,461,606 B2 * | 10/2019 | Ognibene | B62D 5/0427 |
| 10,683,917 B2 * | 6/2020 | Wu | F16H 25/2021 |
| 10,767,741 B1 * | 9/2020 | Liu | F16H 25/2214 |
| 10,907,722 B2 * | 2/2021 | Besser | H02K 11/35 |
| 10,968,584 B1 * | 4/2021 | Gardner | F16D 7/005 |
| 11,001,372 B2 * | 5/2021 | Mastrocola | H02K 7/1004 |

\* cited by examiner

LINEAR MOTION SYSTEM

CROSS REFERENCE TO RELATED APPLICATIONS

This Non-provisional application claims priority under 35 U.S.C. § 119(a) on Patent Application No(s). 201921918529.6 filed in People's Republic of China on Nov. 8, 2019, the entire contents of which are hereby incorporated by reference.

BACKGROUND

Technology Field

This disclosure relates to a linear motion system and, in particular, to a linear motion system capable of adjusting the offset preload without disassembling the device.

Description of Related Art

The linear motion device, such as a ball screw, is widely used in many machining equipment. The configuration of the linear motion device is to provide a precise transmission function, so that the supported stage or object can be moved in a straight line by rotating and linear movements of mechanical operations. The currently used ball screw device mainly comprises a screw, a nut and a plurality of balls. The outer surface of the screw is configured with a spiral groove, and the inner surface of the nut is also configured with an inner spiral groove. The spiral groove of the screw and the inner spiral groove of the nut can together form a raceway, and the balls are contained in the raceway. The balls are capable of rolling with relative to the screw and the nut, thereby reducing the relative rotation friction between the screw and the nut.

In practice, the ball screw device with one nut cannot withstand the large load requirements of heavy machines, so the double-nut ball screw device is invented to solve this problem. In the double-nut ball screw device, a preload between two nuts is provided to eliminate the elastic deformation between the two nuts and the screw caused by the axial load, thereby achieving high positioning accuracy. In order to provide the preload between two nuts, a preload spacer can be disposed between two nuts, so that the grooves of the nuts and the screw can have sufficient offset to achieve the offset preload.

However, the above-mentioned double-nut ball screw device needs to add a preload spacer between two nuts, so the amount of total components of the entire device is larger, which may easily affect the positioning accuracy of the entire device due to the tolerance generated in the manufacturing process. In addition, when it is known that the preload has been shifted, the conventional technology is to stop the processing operation and disassemble the ball screw device for replacing components and/or adjusting the offset preload between the balls and the nuts. This adjusting method will increase a lot of operation time and cost, and the production capacity will be reduced.

SUMMARY

An objective of this disclosure is to provide a linear motion system that can automatically adjust the offset preload value without disassembling the device, thereby performing the adjustment of offset preload without increasing the operation time and cost, and without decreasing the production capacity.

To achieve the above, this disclosure discloses a linear motion system, which comprises a guiding member, a moving member, a plurality of rolling members, a controller, a preload sensing member, and a preload adjusting module. The moving member is slidably disposed on the guiding member. The moving member and the guiding member together form at least one circulation path. When the guiding member moves with relative to the moving member, the moving member generates a linear movement with relative to the guiding member. The rolling members are accommodated in the at least one circulation path. The preload sensing member is disposed on the moving member. The preload sensing member detects a preload value generated by the rolling members and applied to the moving member, and outputs a detecting signal to the controller. The preload adjusting module comprises a preload driver and an adjusting assembly, which are disposed on the moving member individually. The controller controls the preload driver to adjust the adjusting assembly according to the detecting signal, so as to adjust the preload value to a preset value.

In one embodiment, the moving member comprises at least one nut, or at least one nut and a carrier body, or a sliding block.

In one embodiment, the moving member comprises two nuts and a carrier body, the carrier body has a through hole, and the nuts are individually disposed in the through hole.

In one embodiment, the preload sensing member is disposed on at least one of the nuts or the carrier body, and electrically connected with the controller.

In one embodiment, the preload driver is disposed on the carrier body and electrically connected with the controller.

In one embodiment, the adjusting assembly comprises an adjusting member disposed on one of the nuts and tightly fitted to a periphery of the nut.

In one embodiment, the adjusting member is a pulley

In one embodiment, the adjusting assembly further comprises a pulley and a belt, the pulley is disposed on the preload driver, the controller outputs a control signal to the preload driver according to the detecting signal, and the preload driver drives the pulley to rotate according to the control signal, so as to move the belt to rotate the adjusting member for automatically adjusting the preload value to the preset value.

In one embodiment, the preload driver comprises a servo motor or a stepper motor.

In one embodiment, the adjusting assembly comprises an adjusting member and an adjusting rod, the adjusting member is disposed on one of the nuts and tightly fitted to a periphery of the nut, and one end of the adjusting rod is disposed on the adjusting member.

In one embodiment, the controller outputs a control signal to the preload driver according to the detecting signal, and the preload driver drives the adjusting rod to move according to the control signal, so as to rotate the adjusting member for automatically adjusting the preload value to the preset value.

In one embodiment, the preload driver comprises an electric cylinder, a hydraulic cylinder, or a pneumatic cylinder.

In one embodiment, the adjusting member comprises two adjusting sub-members.

In one embodiment, the controller comprises a display monitor, and the controller enables the display monitor to display a current preload value in real-time according to the detecting signal.

In one embodiment, the controller transmits the detecting signal and the preload value to a cloud device for performing statistics and analysis of data and signals.

In one embodiment, the controller is configured in a cloud device.

In one embodiment, the linear motion system is applied to a ball screw, a single-axis motion device, or a linear motion guide device.

As mentioned above, in the linear motion system of this disclosure, the moving member is slidably disposed on the guiding member, and when the guiding member moves with relative to the moving member, the moving member generates a linear movement with relative to the guiding member. The preload sensing member is disposed on the moving member for detecting a preload value generated by the rolling members and applied to the moving member, and outputs a detecting signal to the controller. The preload driver and the adjusting assembly of the preload adjusting module are disposed on the moving member individually. The controller controls the preload driver to adjust the adjusting assembly according to the detecting signal, so as to adjust the preload value to a preset value. Accordingly, the linear motion system of this disclosure can utilize the preload sensing member to automatically detect the preload value, which is generated by the rolling members and applied to the moving member, without disassembling the device. In addition, the preload driver of the preload adjusting module can adjust the adjusting assembly so as to adjust the offset preload between the rolling members and the moving member, thereby adjusting the preload value, which is generated by the rolling members and applied to the moving member, to the preset value. Accordingly, this disclosure can achieve the desired offset preload and automatic compensation. Moreover, this disclosure can adjust the offset preload value without disassembling the device, thereby performing the adjustment of offset preload without increasing the operation time and cost, and without decreasing the production capacity.

BRIEF DESCRIPTION OF THE DRAWINGS

The disclosure will become more fully understood from the detailed description and accompanying drawings, which are given for illustration only, and thus are not limitative of the present disclosure, and wherein:

FIG. 3A is a partial sectional view of the linear motion system as shown in

FIG. 2A;

DETAILED DESCRIPTION OF THE DISCLOSURE

The present disclosure will be apparent from the following detailed description, which proceeds with reference to the accompanying drawings, wherein the same references relate to the same elements.

The linear motion systems of the following embodiments are applied to, for example, ball screws, but this disclosure is not limited thereto. In different embodiments, the linear motion system of this disclosure can be also applied to the single-axis motion device, single-axis robot, or linear motion guide device.

Figure 1:
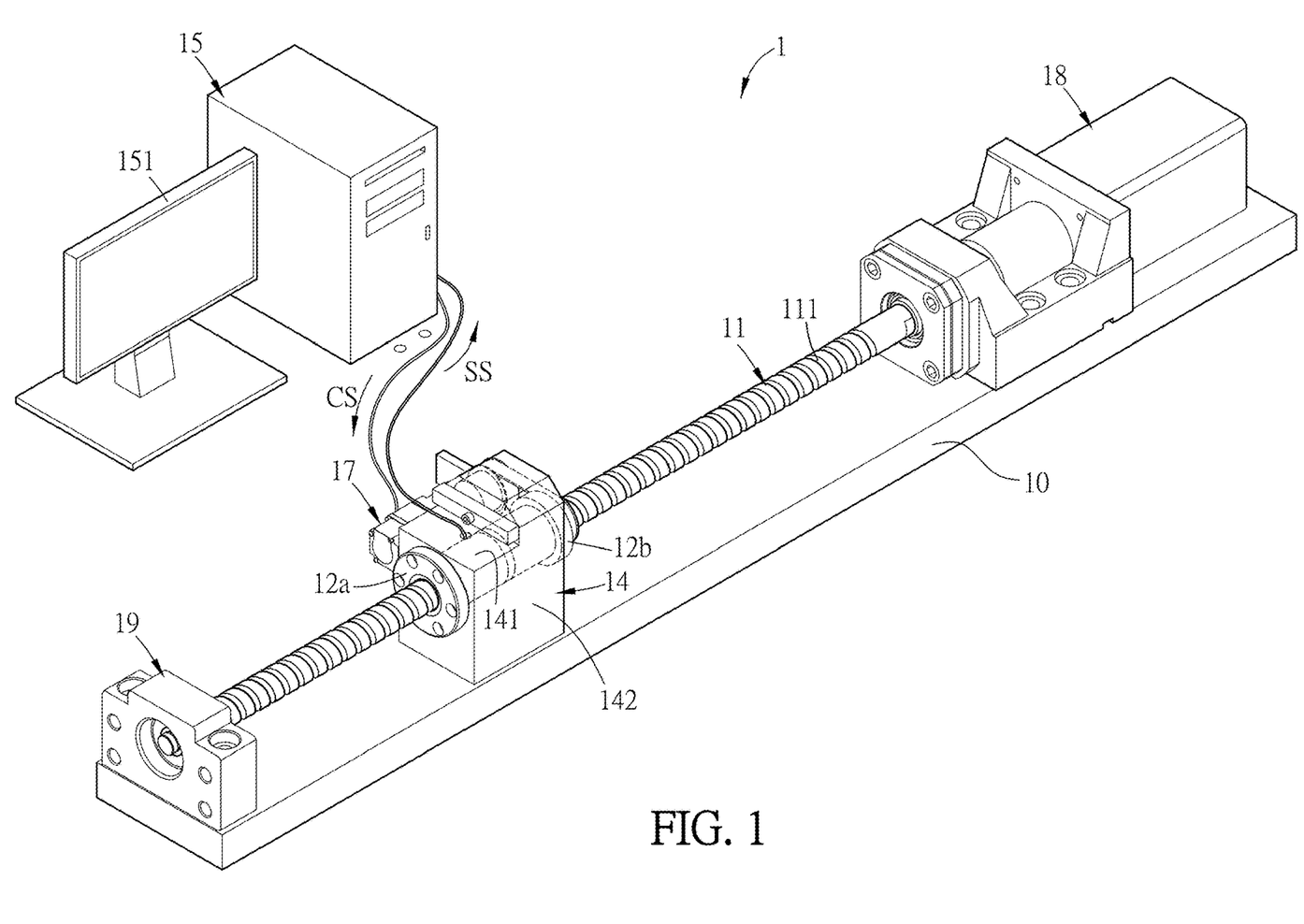
FIG. 1 is a schematic diagram showing a linear motion system according to a first embodiment of this disclosure.
Figure 2A:
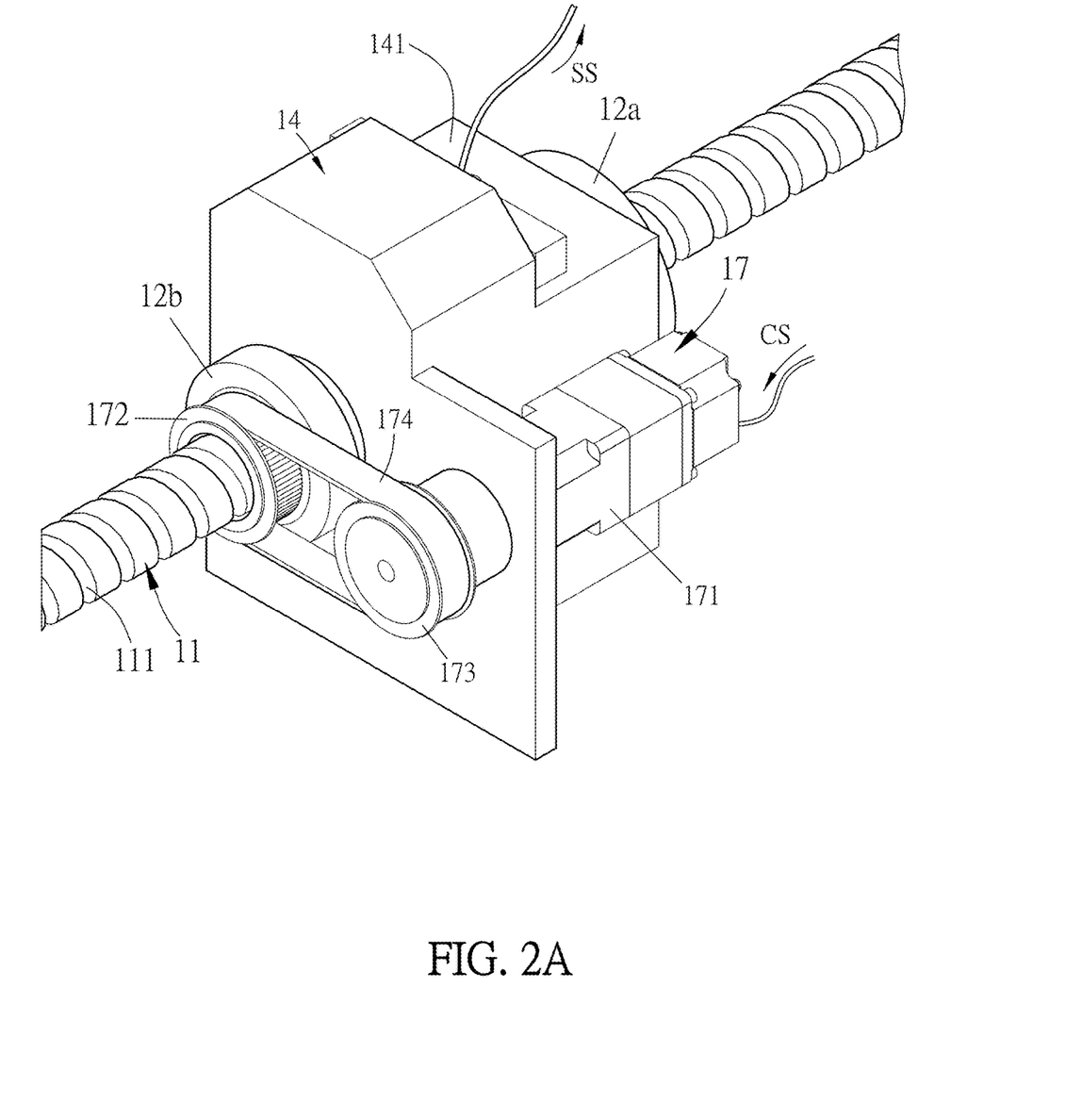
FIG. 2A is a schematic diagram showing a part of the linear motion system according to the first embodiment of this disclosure.
Figure 2B:
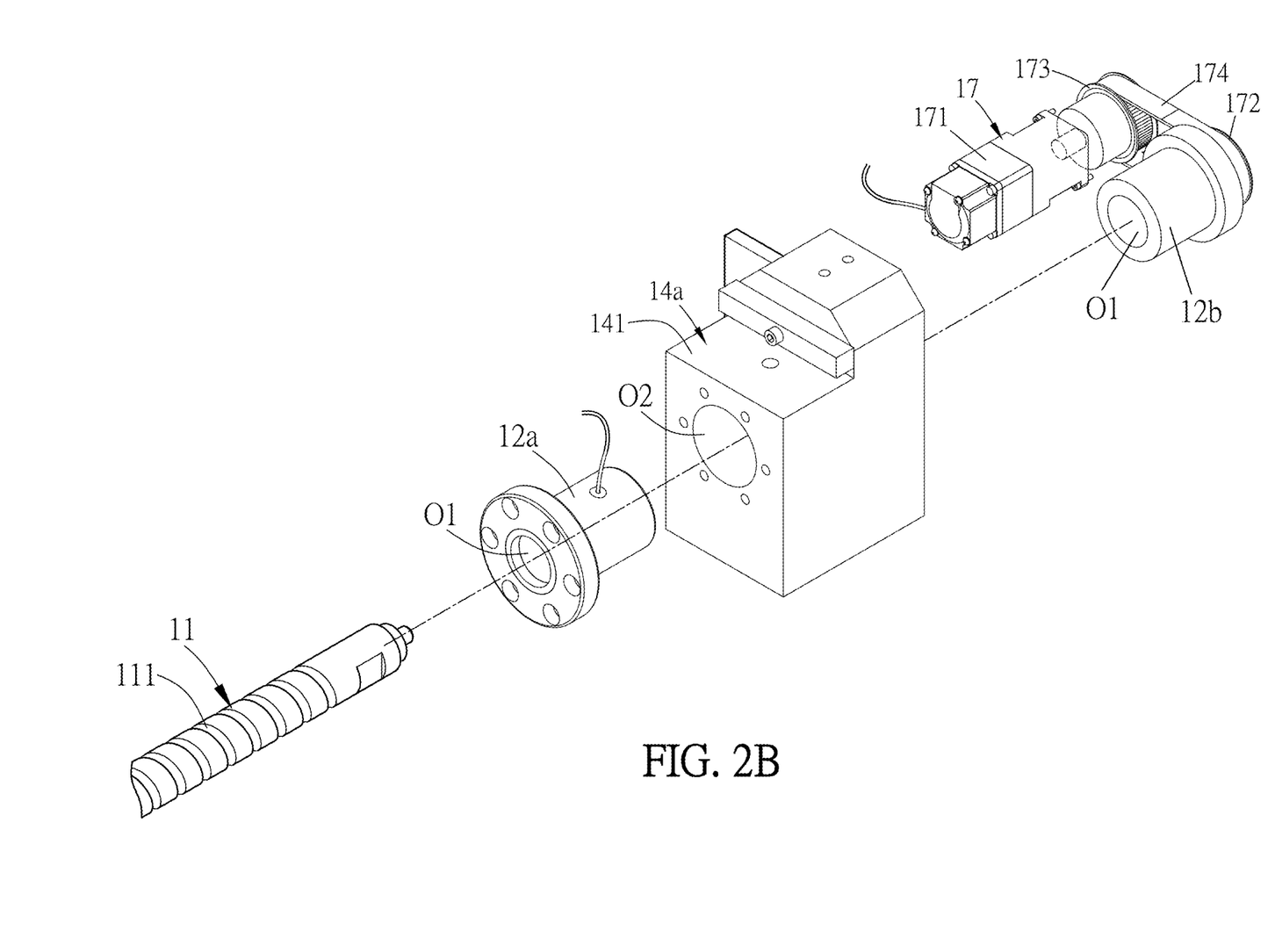
FIG. 2B is an exploded view of FIG. 2A.
Figure 3A:
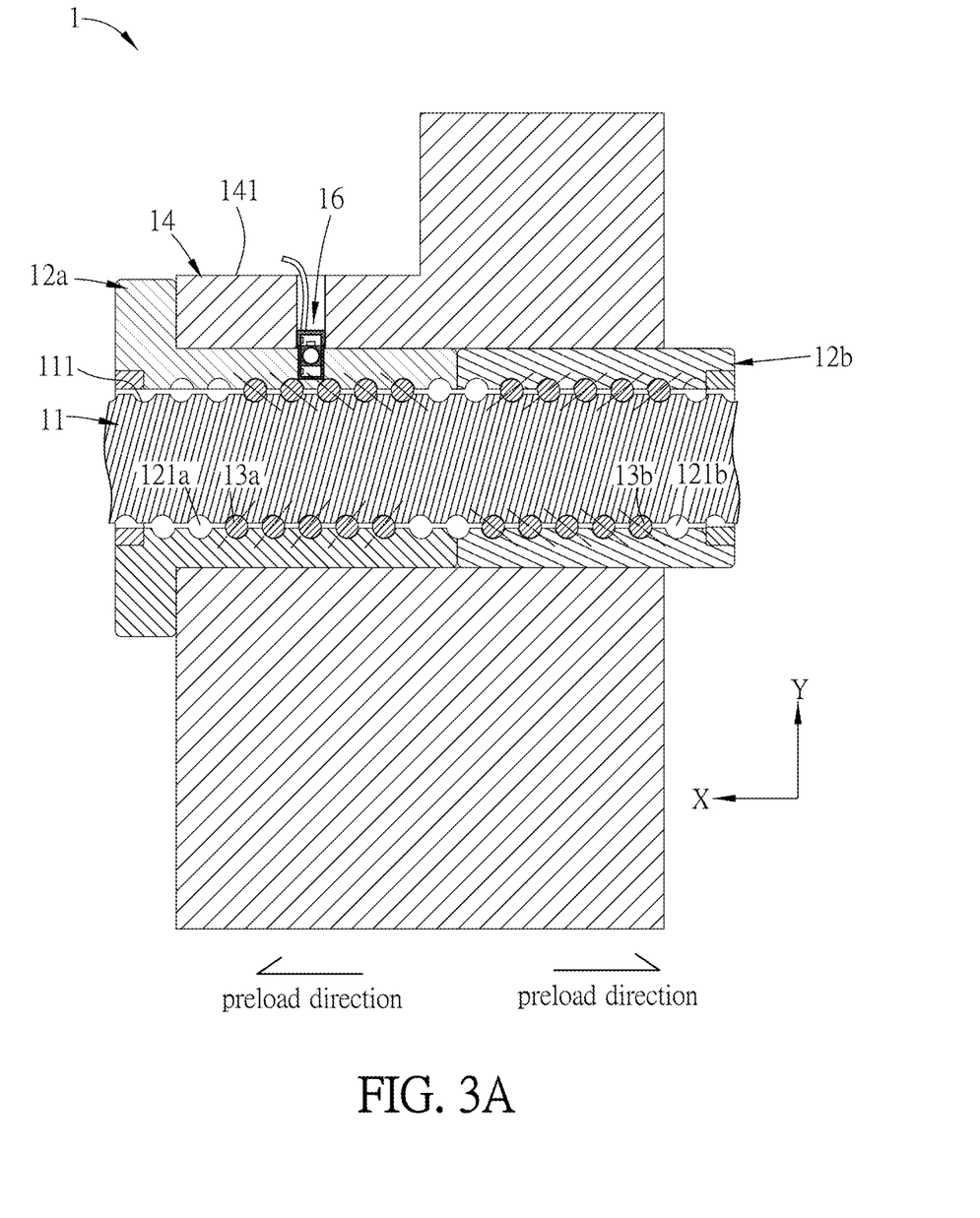
Figure 3B:
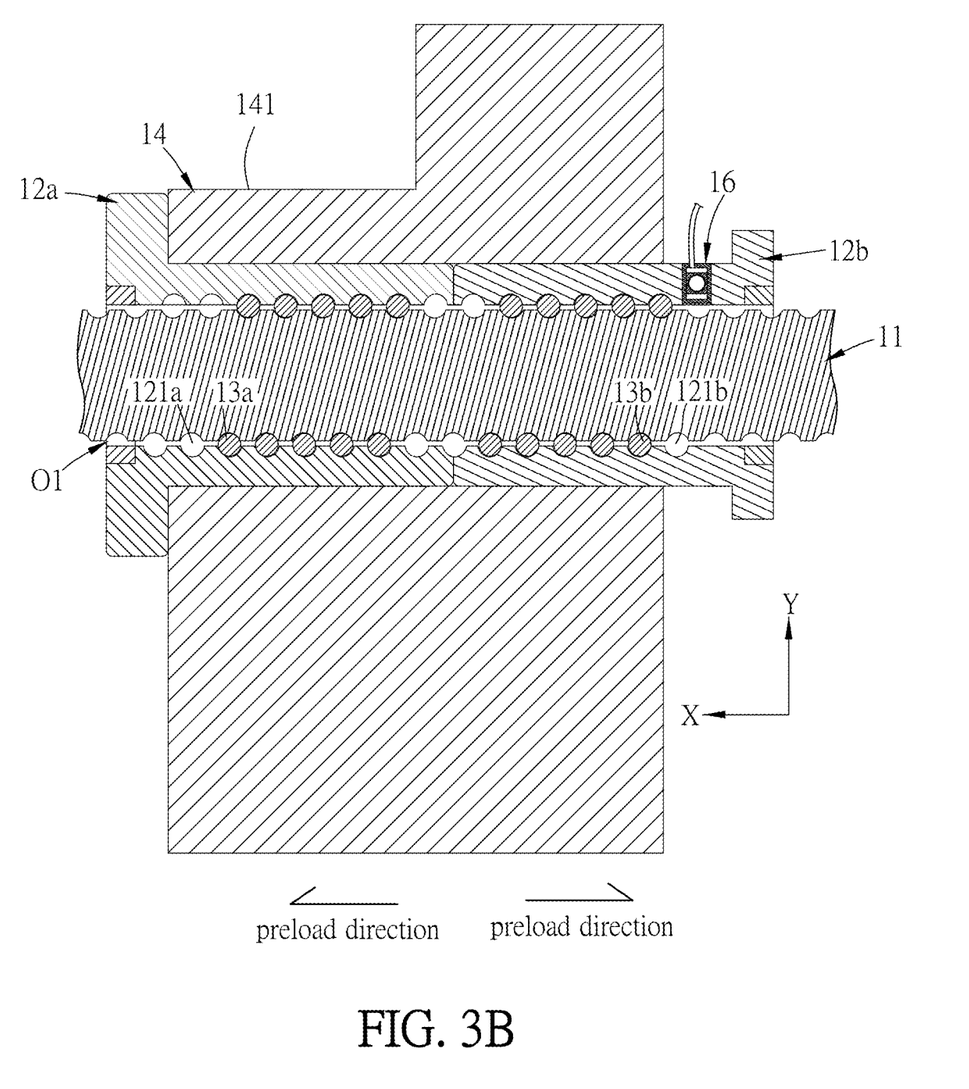
FIG. 3B is another partial sectional view of the linear motion system as shown in FIG. 2A, wherein the preload sensing member is disposed at another position.

FIG. 1 is a schematic diagram showing a linear motion system according to a first embodiment of this disclosure. FIG. 2A is a schematic diagram showing a part of the linear motion system according to the first embodiment of this disclosure, and FIG. 2B is an exploded view of FIG. 2A. FIG. 3A is a partial sectional view of the linear motion system as shown in FIG. 2A, and FIG. 3B is another partial sectional view of the linear motion system as shown in FIG. 2A, wherein the preload sensing member is disposed at another position.

As shown in FIGS. 1 to 3A, the linear motion system 1 of this embodiment comprises a guiding member 11, a moving member, a plurality of rolling members 13a and 13b (FIG. 3A), a controller 15, a preload sensing member 16, and a preload adjusting module 17. In addition, the linear motion system 1 of this embodiment can further comprise a transmission device 18, an installation base 19, and a supporting stage 10, wherein the guiding member 11, the moving member, the transmission device 18 and the installation base 19 are disposed on the supporting stage 10.

In this embodiment, the guiding member 11 is a cylindrical rod, and the outer surface of the guiding member 11 is configured with a continuous winding spiral groove 111 along the axis direction of the cylindrical rod (e.g. the long-axis direction of the guiding member 11). In this case, for example, the guiding member 11 is a (ball) screw, and is configured with one continuous winding spiral groove 111. In another embodiment, if the guiding member 11 is a multi-thread screw, it may comprise two continuous winding spiral grooves. In yet another embodiment, the guiding member 11 can be a linear sliding rail of a linear motion guide device.

The moving member is slidably disposed on the guiding member 11. In addition, the moving member and the guiding member 11 together form at least one circulation path, and the rolling members 13a and 13b are accommodated in the circulation path. When the guiding member 11 moves with relative to the moving member (including displacement or rotation), the moving member generates a linear movement with relative to the guiding member 11 in the long-axis direction of the guiding member 11. In some embodiments, the moving member comprises at least one nut, or at least one nut and a carrier body, or a sliding block. For example, if the moving member comprises one nut, the line motion system may comprise a single-nut ball screw device. If the moving member comprises two nuts, the line motion system may comprise a double-nut ball screw device. If the moving member comprises one sliding block, the line motion system may comprise a single-axis motion device, a single-axis robot, or a linear motion guide device. Referring to FIG. 2B, the line motion system of this embodiment is, for example, a double-nut ball screw device, which includes two nuts 12a and 12b.

Referring to FIGS. 2B and 3A, each of the nuts 12a and 12b of this embodiment is configured with a through hole O1, and the guiding member 11 is disposed through the through holes O1 of the nuts 12a and 12b, so that the two nuts 12a and 12b can individually slide on the guiding member 11. In addition, the moving member of this embodiment further comprises a carrier body 14, and the nuts 12a and 12b are disposed at two opposite sides of the carrier body 14, respectively. Specifically, the carrier body 14 comprises a through hole O2, and the nuts 12a and 12b can be disposed in the through hole O2 through two sides of the through hole O2. In this embodiment, the nuts 12a and 12b can be disposed on the carrier body 14 by, for example, screwing or any of other suitable ways, so that the above-mentioned moving member can comprise the carrier body 14 and the nuts 12a and 12b.

In addition, the inner surfaces of the nuts 12a and 12b are configured with inner spiral grooves 121a and 121b, respectively, corresponding to the spiral groove 111 of the guiding member 11 (FIG. 3A). A part of the spiral groove 111 and each of the inner spiral grooves 121a and 121b of the nuts 12a and 12b can together form an internal raceway. Besides, those skilled persons in the art all know that in order to form individual circulation paths between the guiding member 11 and the nuts 12a and 12b, it is possible to provide the circulation members or reflow members (not shown) in the nuts 12a and 12b to form a circulation channel (or reflow channel) together with a part of the spiral groove 111. Accordingly, each of the nuts 12a and 12b can individually form an independent circulation path together with the guiding member 11, and the rolling members 13a and 13b can be disposed and circulated in the corresponding circulation paths, respectively. When the guiding member 11 rotates with respect to the nuts 12a and 12b, the nuts 12a and 12b and the carrier body 14 (the moving member) can generate a linear movement in the long-axis direction of the guiding member 11 with respect to the guiding member 11. In this embodiment, the rolling members 13a and 13b are balls for example. In other embodiments, the rolling members 13a and 13b can also be rollers.

Referring to FIG. 1, one end of the guiding member 11 is connected to the transmission device 18, and the guiding member 11 is disposed through the moving member (including the carrier body 14 and the nuts 12a and 12b). The other end of the guiding member 11 is installed on the installation base 19. Accordingly, when the transmission device 18 rotates, the guiding member 11 can be driven to rotate with respect to the nuts 12a and 12b, so that the nuts 12a and 12b and the carrier body 14 can generate a linear movement in the long-axis direction of the guiding member 11 with respect to the guiding member 11. In some embodiments, the transmission device 18 can be, for example but not limited to, a hollow shaft motor. In some processing embodiments, the carrier body 14 can support or connect the to-be-processed object. When the guiding member 11 rotates with respect to the nuts 12a and 12b, the carrier body 14 and the to-be-processed object can generate the linear movement with respect to the guiding member 11 for performing the following processes. In some embodiments, if the moving member excludes the carrier body 14, the nut(s) may support or connect the to-be-processed object.

As shown in FIG. 3A, in this embodiment, when the double-nut ball screw device operates to generate relative motion between the guiding member 11 and the moving member (including the nuts 12a and 12b and the carrier body 14), the multiple rolling members 13a and 13b (balls) in the inner raceway can provide preloads to the nuts 12a and 12b, respectively, thereby eliminating the elastic deformation between the moving member and the guiding member 11 caused by the axial load, and thus maintaining the stiffness of the entire device and system. Accordingly, the ball screw device can achieve high positioning accuracy. Taking the nut 12a shown in the left side of FIG. 3A as an example, the upper rolling members (balls) 13a can provide a preload to the nut 12a in the direction from down-right to up-left, and the lower rolling members (balls) 13a can provide a preload to the nut 12a in the direction from up-right to down-left.

Referring to FIGS. 1 and 3A, the preload sensing member 16 is disposed on the moving member. In this embodiment, the preload sensing member 16 can be disposed on at least one of the nuts 12a and 12b or on the carrier body 14, and is electrically connected to the controller 15 for precisely detecting a preload value inside the moving member generated by the rolling members 13a and 13b and applied to the moving member, and outputting a detecting signal SS to the controller 15 accordingly. To be noted, the shape of the preload sensing member 16 is not limited and can be cylindrical, thin plate, film, or any of other shapes. In this embodiment, the preload sensing member 16 is, for example but not limited to, a strain gauge. In addition, in this embodiment, one preload sensing member 16 is disposed on the nut 12a. In another embodiment, it is possible to configure a plurality of preload sensing members 16 on at least one of the nuts 12a and 12b or the carrier body 14. In one embodiment, the preload sensing member 16 can be disposed on the nut 12b. In one embodiment, at least one preload sensing member 16 is disposed on the nut 12a, and at least one preload sensing member 16 is disposed on the nut 12b. In one embodiment, the preload sensing member 16 is disposed on the carrier body 14. In one embodiment, as shown in FIG. 3B, the preload sensing member 16 is disposed on the nut 12b, which is located adjacent to the preload adjusting module 17. This disclosure is not limited thereto. In addition, as shown in FIG. 1, the preload sensing member 16 is disposed on the nut 12a through the top surface 141 of the carrier body 14. In another embodiment, the preload sensing member 16 can be disposed on the nut 12a through the side surface 142 of the carrier body 14, and this disclosure is not limited.

When the ball screw device is operated, the horizontal component force in the direction parallel to the long-axis direction (direction X) of the guiding member 11 will be detected by the preload sensing member 16, and then the preload sensing member 16 outputs the detecting signal SS to the controller 15. The controller 15 can obtain the real preload value after calculation. In this embodiment, since the horizontal component force divided by the preload value is equal to the cosine function, if the horizontal component force and the angle between the preload and the horizontal direction are known, the actual preload value can be calculated based on the cosine function.

With reference to FIGS. 2A and 2B, the preload adjusting module 17 comprises a preload driver 171 and an adjusting assembly. The preload driver 171 and the adjusting assembly are disposed on the moving member individually. In this embodiment, the preload driver 171 is disposed on the side surface of the carrier body 14 and is electrically connected to the controller 15. Herein, the preload driver 171 can be, for example but not limited to, a servo motor or a stepper motor, and the controller 15 can be, for example but not limited to, a computer or a server. In addition, the above-mentioned preload sensing member 16 and/or the preload driver 171 can be electrically connected to the controller 15 by the wired or wireless method. In this embodiment, the controller 15 is a computer, the preload driver 171 is a servo motor, and the preload sensing member 16 and the preload driver 171 are electrically connected to the controller 15 by the wired method. In some embodiments, the controller 15 can be disposed at a near end of the ball screw device (around the machine), at a remote end of the ball screw device (e.g. in the central control room), or in a cloud device. If the controller 15 is disposed in a cloud device, the preload sensing member 16 and the preload driver 171 are electrically connected to the controller 15 by the wireless method. In some embodiments, the controller 15 can transmit the detecting signal SS, the control signal CS and the preload value to the cloud device for performing the statistics and analysis of data and signals. Accordingly, the users can realize the operation and status of the linear motion system through statistics and analysis information from the cloud device.

In addition, the adjusting assembly of this embodiment comprises an adjusting member 172, which can be disposed on one of the nuts 12a and 12b and is tightly fitted to the periphery of the nut 12a or 12b. In this embodiment, the adjusting member 172 is a pulley, which is disposed on one side of the nut 12b away from the nut 12a, and is tightly fitted to the periphery of the nut 12b. In another embodiment, the adjusting member 172 can be disposed at one side of the nut 12a away from the nut 12b, and is tightly fitted to the periphery of the nut 12a. Moreover, the adjusting assembly of this embodiment can further comprise a pulley 173 and a belt 174. The pulley 173 is disposed at the preload driver 171, and the belt 174 is disposed at the pulley 173 and the adjusting member 172. In this case, the belt 174 is a toothed belt disposed around the pulley 173 and the adjusting member 172. Of course, the connection mechanism of the adjusting assembly and the adjusting member of this embodiment can be carried out by other means such as linking rod, gears, or the likes for achieving the same function as the above aspect (the pulley and belt).

Accordingly, when the controller 15 receives the detecting signal SS from the preload sensing member 16, the controller 15 can control the preload driver 171 according to the detecting signal SS to adjust the adjusting assembly, thereby automatically adjusting the preload value to a preset value. Specifically, as shown in FIGS. 1 and 2A, the controller 15 of this embodiment can calculate based on the detecting signal SS transmitted from the preload sensing member 16 to obtain the current preload value, and then the controller 15 outputs a control signal CS to the preload driver 171 (a servo motor) according to the calculated current preload value (i.e. the detecting signal SS). Accordingly, the preload driver 171 can drive the pulley 173 to rotate based on the control signal CS, so as to rotate the adjusting member 172 (another pulley) through the belt 174 for adjusting the force applied to the outer side of the nut 12b. Finally, the preload can be adjusted from the current preload value to the preset value. Moreover, in this embodiment, the controller 15 can further comprise a display monitor 151. While the preload driver 171 adjusts the adjusting assembly, the controller 15 can calculates based on the detecting signal SS to obtain the current preload value, and the display monitor 151 can display the current preload value in real-time, so that the user can monitor and realize the variation of the current preload value.

Specifically, when the controller 15 obtains the current preload value of the ball screw device according to the detecting signal SS transmitted from the preload sensing member 16, the controller 15 will compare the obtained current preload value to a preset value stored in the memory of the controller 15. For example, when it is found that the difference between the detected current preload value and the preset value exceeds a threshold value, or the preload value exceeds a certain range, the controller 15 (e.g. a computer) can transmit a corresponding control signal CS to the preload driver 171 after calculation, for enabling the preload driver to drive the pulley 173 to rotate. Then, the pulley 173 can rotate the adjusting member 172 through the belt 174, thereby adjusting the force applied to the outer side of the nut 12b so as to adjusting the preload value. As a result, the preload value generated by the rolling members 13a and 13b and applied to the nuts 12a and 12b can be automatically adjusted to the preset value, thereby achieving the desired offset preload and automatic compensation.

Accordingly, the linear motion system 1 of this embodiment can utilize the preload sensing member 16 to automatically detect the preload applied from the rolling members 13a and 13b to the moving member, and automatically adjust the offset preload value between the rolling members 13a and 13b and the nuts 12a and 12b without disassembling the device, thereby performing the adjustment of offset preload without increasing the operation time and cost for disassembling the device, and without decreasing the production capacity.

Figure 4:
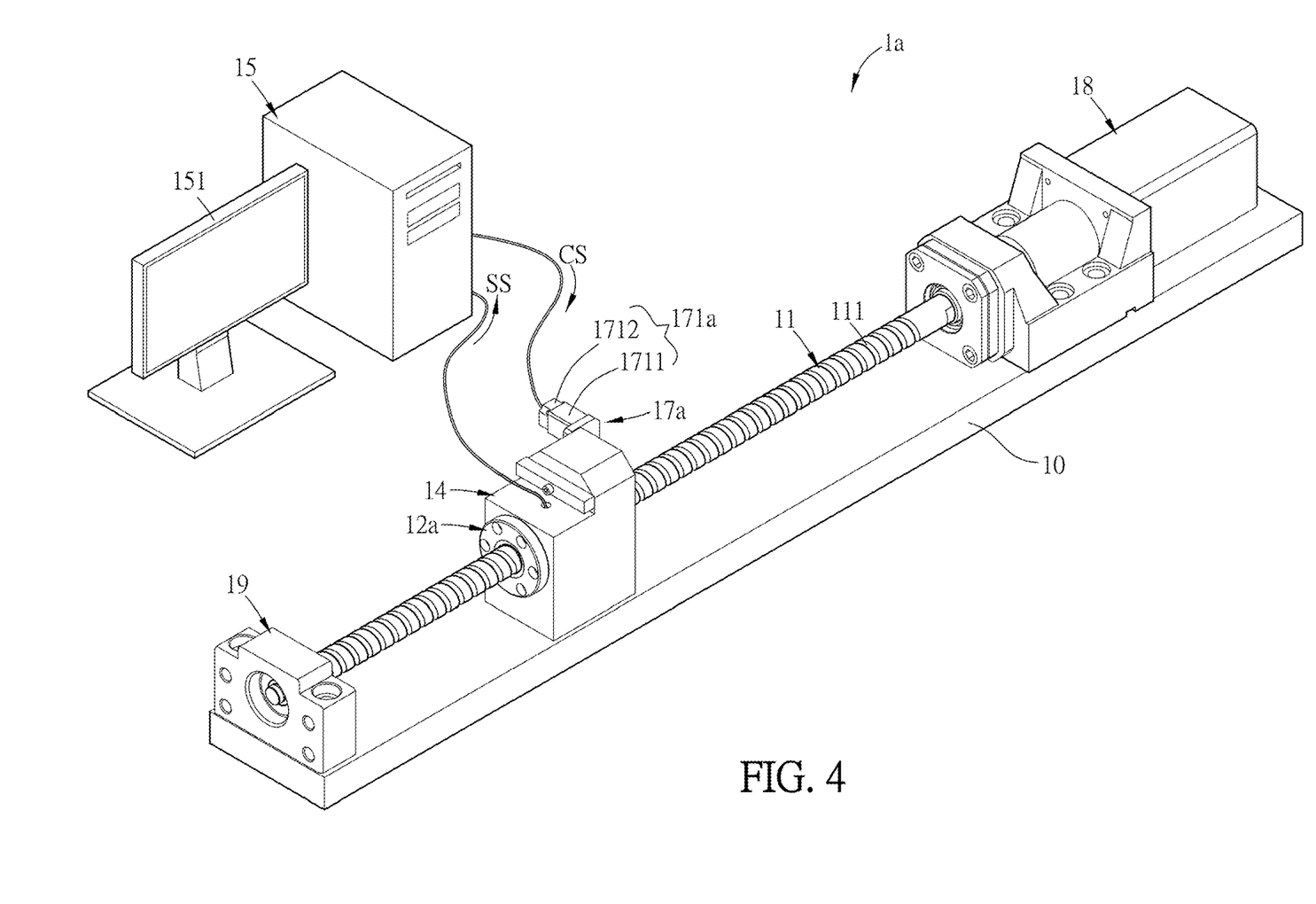
FIG. 4 is a schematic diagram showing a linear motion system according to a second embodiment of this disclosure.
Figure 5A:
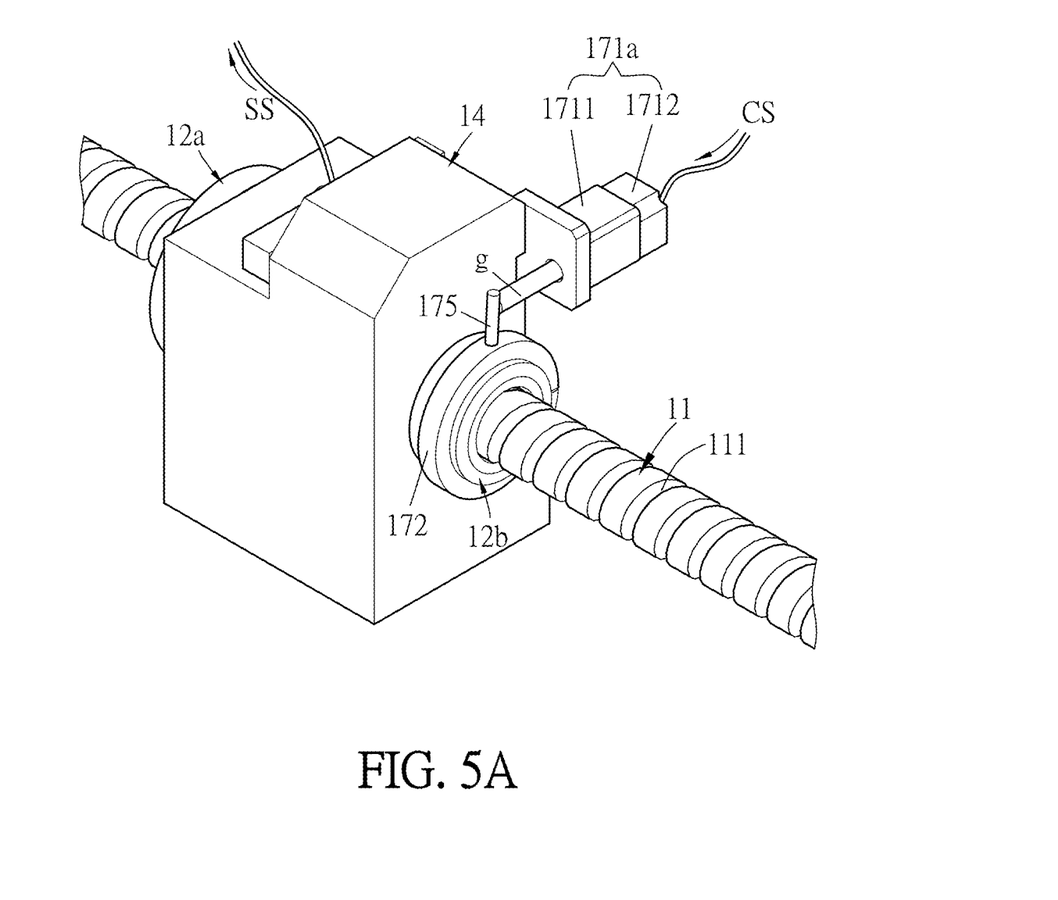
FIG. 5A is a schematic diagram showing a part of the linear motion system according to the second embodiment of this disclosure.
Figure 5B:
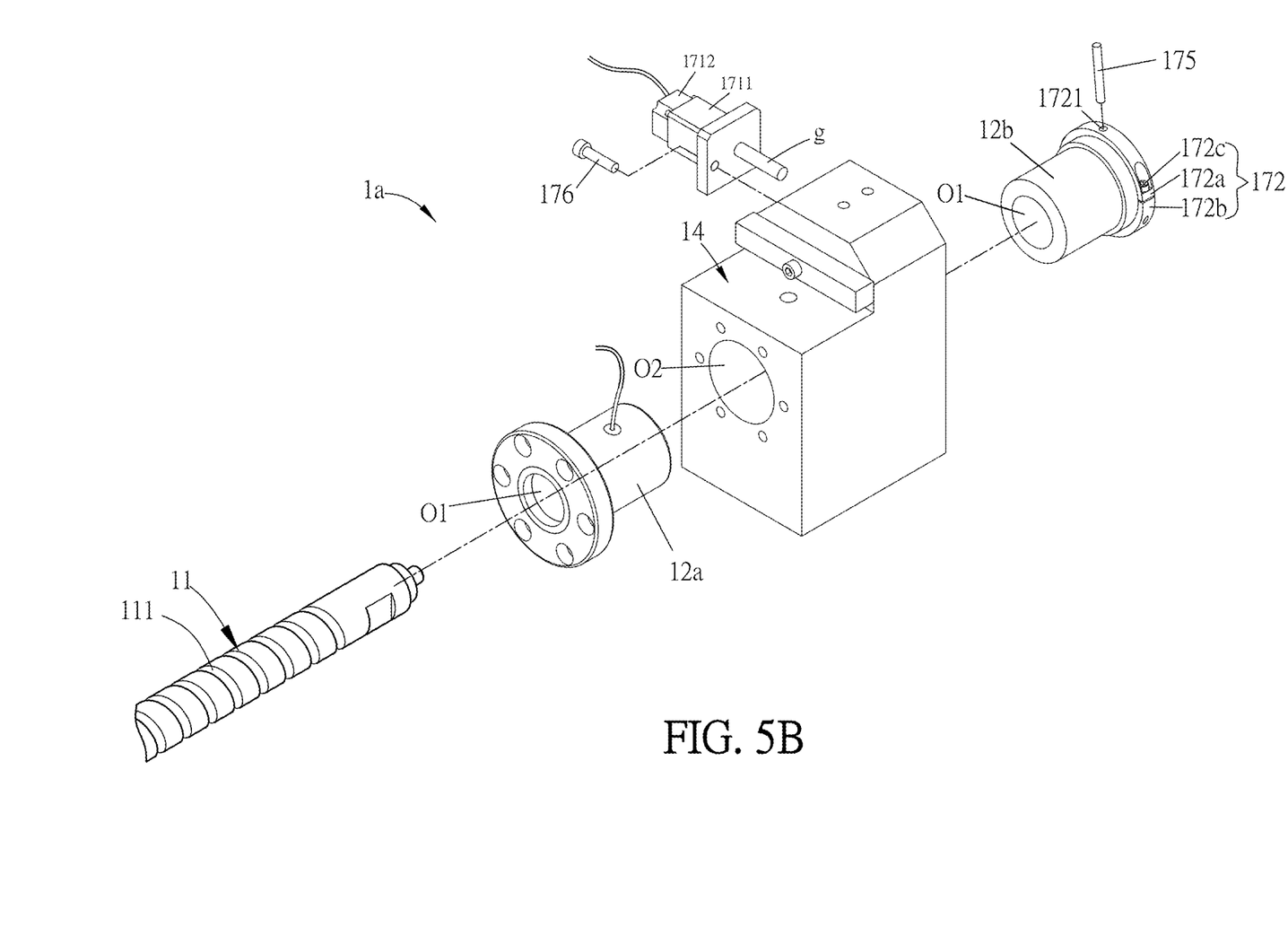
FIG. 5B is an exploded view of FIG. 5A.

FIG. 4 is a schematic diagram showing a linear motion system according to a second embodiment of this disclosure, FIG. 5A is a schematic diagram showing a part of the linear motion system according to the second embodiment of this disclosure, and FIG. 5B is an exploded view of FIG. 5A.

As shown in FIGS. 4, 5A and 5B, the linear motion system 1a of the second embodiment is mostly the same as the linear motion system 1 of the first embodiment. Different from the linear motion system 1 of the first embodiment, the linear motion system 1a of the second embodiment comprises a different preload driver 171a of the preload adjusting module 17a. In the second embodiment, the preload driver 171a comprises an electric cylinder 1711 and a motor 1712 for driving the electric cylinder 1711, instead of a servo motor or a stepper motor. The motor 1712 can drive the electric cylinder 1711 to operate for adjusting the preload value to the present value.

Figure 5C:
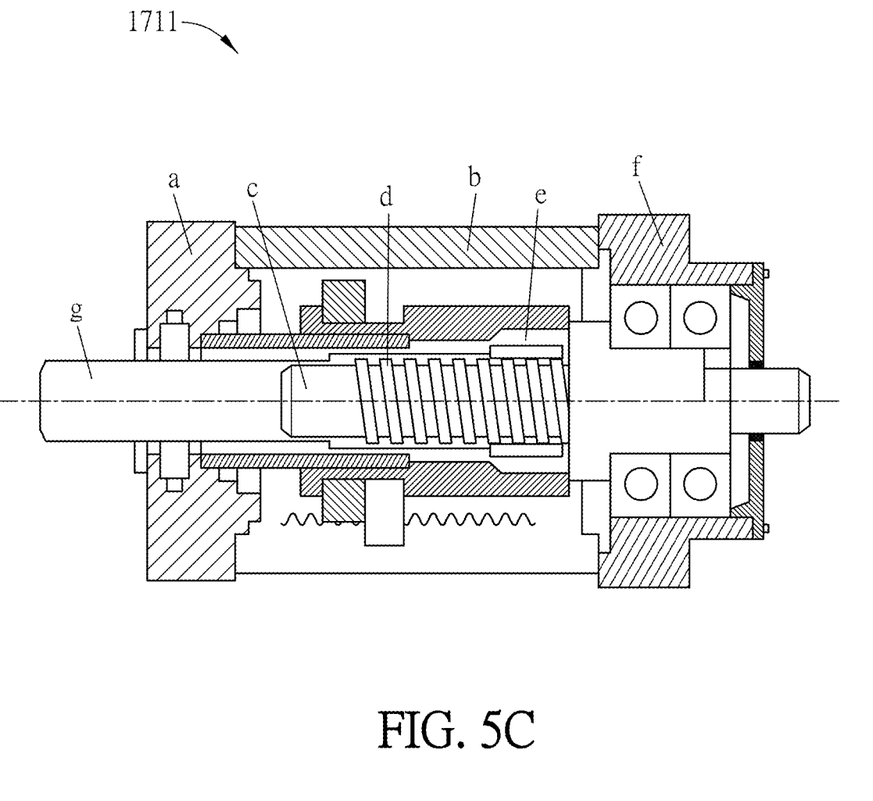
FIG. 5C is a schematic diagram showing an electric cylinder of the preload driver according to an embodiment of this disclosure.

FIG. 5C is a schematic diagram showing an electric cylinder of the preload driver according to an embodiment of this disclosure. As shown in FIG. 5C, the electric cylinder 1711 mainly comprises a bearing cap a, a cylinder b, a piston rod c, a ball screw d, a ball screw nut e, a driver housing f, and a shaft g. The piston rod c is connected to the ball screw d. The piston rod c, the ball screw d, and the ball screw nut e are all disposed in the accommodating space defined by the bearing cap a, the cylinder b and the driver housing f. The ball screw nut e is connected to the shaft g, and the shaft g is penetrated and protrudes from the bearing cap a. Therefore, when the motor 1712 (FIG. 5A) drives the ball screw d of the electric cylinder 1711 to rotate, the ball screw nut e and the shaft g can generate a movement with relative to the ball screw d in the direction parallel to the long-axis direction of the ball screw d, thereby moving the shaft g in a direction protruding from the bearing cap a.

Moreover, as shown in FIGS. 5A and 5B, the adjusting assembly of this embodiment comprises an adjusting member 172 and an adjusting rod 175. The adjusting member is disposed on one of the two nuts 12a and 12b, and is tightly fitted to the periphery of the nut. One end of the adjusting rod 175 is disposed on the adjusting member 172. In this embodiment, for example, the adjusting member 172 is disposed at one side of the nut 12b away from the nut 12a and is tightly fitted to the periphery of the nut 12b. In another embodiment, the adjusting member 172 can be disposed at one side of the nut 12a away from the nut 12b and is tightly fitted to the periphery of the nut 12a. Alternatively, two adjusting members 172 are provided and disposed at the outer sides of the nuts 12a and 12b, respectively, and this disclosure is not limited thereto.

In this embodiment, the adjusting member 172 has a ring shape and at least comprises two adjusting sub-members 172a and 172b and at least a locking member 172c. Each of the adjusting sub-members 172a and 172b has a half-ring shape, and the adjusting sub-members 172a and 172b are assembled around the nut 12b by the locking member(s) 172c (e.g. screws), thereby forming the adjusting member 172. Accordingly, the adjusting member 172 can be easily assembled, and the tightness of the assembled adjusting sub-members 172a and 172b can be adjusted by the locking member 172c. In addition, one end of the adjusting rod 175 is inserted into the recess 1721 of the adjusting member 172, so that the adjusting member 172 can be rotated by the adjusting rod 175 to press on the outer side of the nut 12b, thereby adjusting the preload value of the ball screw.

In addition, the preload driver 171a can be locked on the carrier body 14 by, for example, the licking member 176 (FIG. 5B), and the motor 1712 of the preload driver 171a is electrically connected to the controller 15. Accordingly, when the controller 15 receives the detecting signal SS from the preload sensing member 16, the controller 15 can control the preload driver 171a to adjust the adjusting assembly according to the detecting signal SS, thereby automatically adjusting the preload value to the preset value. Specifically, the controller 15 can calculate based on the detecting signal SS transmitted from the preload sensing member 16 to obtain the preload value, and then the controller 15 outputs a corresponding control signal CS to the motor 1712 according to the preload value (i.e. the detecting signal SS). Accordingly, the motor 1712 can drive the shaft g of the electric cylinder 1711 to move for pushing the adjusting rod 175 to rotate the adjusting member 172, thereby applying a force to the nut 12b so as to automatically adjust the preload value to the preset value. This configuration can achieve the desired offset preload and automatic compensation.

As a result, the linear motion system 1a of this embodiment can utilize the preload sensing member 16 to automatically detect the preload applied from the rolling members 13a and 13b to the moving member, and automatically adjust the offset preload value between the rolling members 13a and 13b and the nuts 12a and 12b through the adjusting assembly and the preload driver 171a (the electric cylinder 1711 and the motor 1712) of the preload adjusting module 17a without disassembling the device, thereby performing the adjustment of offset preload without increasing the operation time and cost for disassembling the device, and without decreasing the production capacity To be noted, the above-mentioned preload driver 171a comprises, for example, an electric cylinder 1711 and a motor 1712. Of course, in other embodiments, the preload driver may comprise a hydraulic cylinder or a pneumatic cylinder, which is actively controlled by the controller 15. Since the internal structure and control method of the hydraulic cylinder or pneumatic cylinder are not the key points of this disclosure, and the skilled person in the art can easily find the component parts and the operation principle thereof from the public references, so the detailed descriptions thereof will be omitted herein.

In summary, in the linear motion system of this disclosure, the moving member is slidably disposed on the guiding member, and when the guiding member moves with relative to the moving member, the moving member generates a linear movement with relative to the guiding member. The preload sensing member is disposed on the moving member for detecting a preload value generated by the rolling members and applied to the moving member, and outputs a detecting signal to the controller. The preload driver and the adjusting assembly of the preload adjusting module are disposed on the moving member individually. The controller controls the preload driver to adjust the adjusting assembly according to the detecting signal, so as to adjust the preload value to a preset value. Accordingly, the linear motion system of this disclosure can utilize the preload sensing member to automatically detect the preload value, which is generated by the rolling members and applied to the moving member, without disassembling the device. In addition, the preload driver of the preload adjusting module can adjust the adjusting assembly so as to adjust the offset preload between the rolling members and the moving member, thereby adjusting the preload value, which is generated by the rolling members and applied to the moving member, to the preset value. Accordingly, this disclosure can achieve the desired offset preload and automatic compensation. Moreover, this disclosure can adjust the offset preload value without disassembling the device, thereby performing the adjustment of offset preload without increasing the operation time and cost, and without decreasing the production capacity.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A linear motion system, comprising:
a guiding member;
a moving member slidably disposed on the guiding member, wherein the moving member and the guiding member together form at least one circulation path, and when the guiding member moves with relative to the moving member, the moving member generates a linear movement with relative to the guiding member;
a plurality of rolling members accommodated in the at least one circulation path;
a controller;
a preload sensing member disposed on the moving member, wherein the preload sensing member detects a preload value generated by the rolling members and applied to the moving member, and outputs a detecting signal to the controller; and
a preload adjusting module comprising a preload driver and an adjusting assembly, wherein the preload driver and the adjusting assembly are disposed on the moving member individually;
wherein the controller controls the preload driver to adjust the adjusting assembly according to the detecting signal, so as to adjust the preload value to a preset value.

2. The linear motion system of claim 1, wherein the moving member comprises at least one nut, or at least one nut and a carrier body, or a sliding block.

3. The linear motion system of claim 1, wherein the moving member comprises two nuts and a carrier body, the carrier body has a through hole, and the nuts are individually disposed in the through hole.

4. The linear motion system of claim 3, wherein the preload sensing member is disposed on at least one of the nuts or the carrier body, and electrically connected with the controller.

5. The linear motion system of claim 3, wherein the preload driver is disposed on the carrier body and electrically connected with the controller.

6. The linear motion system of claim 5, wherein the adjusting assembly comprises an adjusting member disposed on one of the nuts and tightly fitted to a periphery of the nut.

7. The linear motion system of claim 6, wherein the adjusting member is a pulley.

8. The linear motion system of claim 6, wherein the adjusting assembly further comprises a pulley and a belt, the pulley is disposed on the preload driver, the controller outputs a control signal to the preload driver according to the detecting signal, and the preload driver drives the pulley to rotate according to the control signal, so as to move the belt to rotate the adjusting member for automatically adjusting the preload value to the preset value.

9. The linear motion system of claim 8, wherein the preload driver comprises a servo motor or a stepper motor.

10. The linear motion system of claim 3, wherein the adjusting assembly comprises an adjusting member and an adjusting rod, the adjusting member is disposed on one of the nuts and tightly fitted to a periphery of the nut, and one end of the adjusting rod is disposed on the adjusting member.

11. The linear motion system of claim 10, wherein the controller outputs a control signal to the preload driver according to the detecting signal, and the preload driver drives the adjusting rod to move according to the control signal, so as to rotate the adjusting member for automatically adjusting the preload value to the preset value.

12. The linear motion system of claim 10, wherein the preload driver comprises an electric cylinder, a hydraulic cylinder, or a pneumatic cylinder.

13. The linear motion system of claim 10, wherein the adjusting member comprises two adjusting sub-members.

14. The linear motion system of claim 1, wherein the controller comprises a display monitor, and the controller enables the display monitor to display a current preload value in real-time according to the detecting signal.

15. The linear motion system of claim 1, wherein the controller transmits the detecting signal and the preload value to a cloud device for performing statistics and analysis of data and signals.

16. The linear motion system of claim 1, wherein the controller is configured in a cloud device.

17. The linear motion system of claim 1, wherein the linear motion system is applied to a ball screw, a single-axis motion device, or a linear motion guide device.

* * * * *